United States Patent
Strackbein et al.

(10) Patent No.: US 6,549,127 B1
(45) Date of Patent: Apr. 15, 2003

(54) SWITCHGEAR CABINET MONITORING ARRANGEMENT

(75) Inventors: Heinrich Strackbein, Biebertal (DE); Markus Hain, Dillenburg (DE); Jörg Kreiling, Biebertal (DE); Michael Seelbach, Freudenberg (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/526,018

(22) Filed: Mar. 15, 2000

(30) Foreign Application Priority Data

Mar. 17, 1999 (DE) .......................................... 199 11 824

(51) Int. Cl.[7] .............................................. G08B 29/00
(52) U.S. Cl. .............................. 340/506; 714/4; 714/23; 713/321; 361/605
(58) Field of Search ..................... 714/4, 23; 713/321; 361/605; 340/506

(56) References Cited

U.S. PATENT DOCUMENTS

| | | | | |
|---|---|---|---|---|
| 5,400,246 A | * | 3/1995 | Wilson | 700/17 |
| 5,477,091 A | * | 12/1995 | Fiorina et al. | 307/26 |
| 5,787,429 A | * | 7/1998 | Nikolin, Jr. | 707/10 |
| 5,889,474 A | * | 3/1999 | LaDue | 340/825.49 |
| 6,060,994 A | * | 5/2000 | Chen | 340/521 |
| 6,163,854 A | * | 12/2000 | Hain et al. | 713/321 |
| 6,222,448 B1 | * | 4/2001 | Beck et al. | 340/3.1 |

FOREIGN PATENT DOCUMENTS

| | | |
|---|---|---|
| DE | 196 09 689 A1 | 9/1997 |
| DE | 197 10 016 C1 | 4/1998 |

\* cited by examiner

Primary Examiner—John Follansbee
Assistant Examiner—Thomas Pham
(74) Attorney, Agent, or Firm—Pauley Petersen Kinne & Erickson

(57) ABSTRACT

A switchgear cabinet monitoring arrangement having a base monitoring device which is arranged or intended to be arranged in a switchgear cabinet and has at least one bus connection, several sensor connections and at least one triggering connection, for monitoring, controlling and/or regulating switchgear cabinet functions. Various monitoring and control functions of several different switchgear cabinets, along with a relatively simple construction, are achieved because a further monitoring device arranged or to be arranged in a respective further switchgear cabinet is assigned to the base monitoring device, which is connected to the base monitoring device by a field bus. The further monitoring device also has several sensor connections and at least one triggering connection and is designed for monitoring, controlling and/or regulating switchgear cabinet functions.

6 Claims, 1 Drawing Sheet

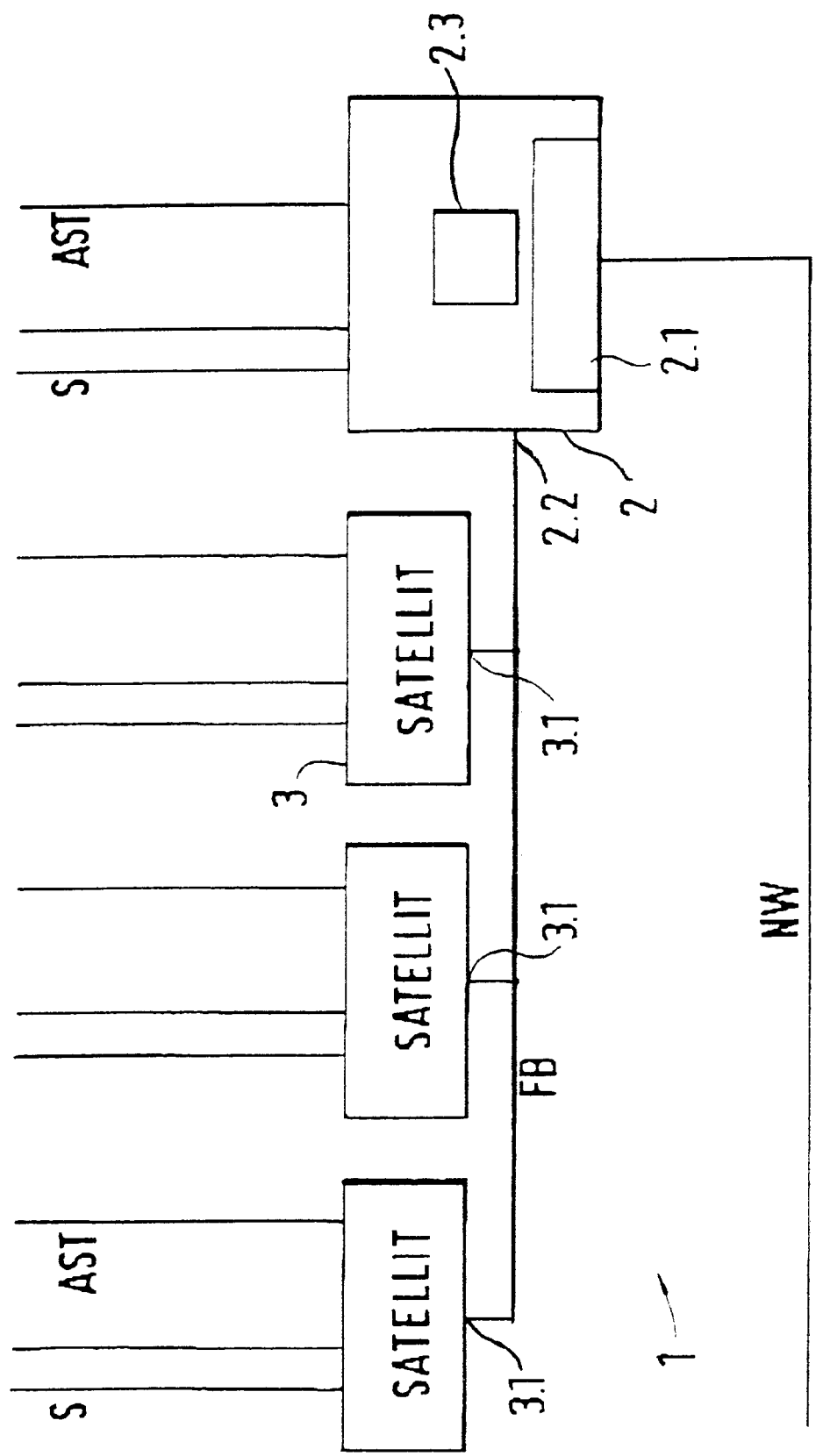

SWITCHGEAR CABINET MONITORING ARRANGEMENT

BACKGROUND OF THE INVENTION

1. Field of the Invention

This invention relates to a switchgear cabinet monitoring arrangement, having a base monitoring device, which is arranged or intended to be arranged in a switchgear cabinet and has at least one bus connection, several sensor connections, and at least one triggering connection, for monitoring, controlling and/or regulating switchgear cabinet functions.

2. Description of Prior Art

A switchgear cabinet monitoring arrangement of this type is disclosed in German Patent Reference DE 196 09 689 A1. This known switchgear cabinet monitoring arrangement has a central control device and is adapted to various uses of the switchgear cabinet and, together with a versatile sensor arrangement for various measured values, such as the temperature, closing position of the door, vibrations, smoke development and humidity, as well as actuators, by which the sensor signals can be suitably acted upon with the control device. Control and regulation provides a design of the switchgear cabinet for various uses, and thus the control device with the signal processing and signal evaluation units is accordingly elaborately laid out. For example, it must also have a network connecting unit for connection to a network.

A further switchgear cabinet monitoring arrangement is disclosed in German Patent Reference DE 197 10 016 C1, wherein the switchgear cabinet monitoring arrangement is connected to a network. The switchgear cabinet monitoring arrangement is connected to a bus system, to whose other end a master computer is connected, so that it is possible to pass on the signals from the switchgear cabinet monitoring arrangement via the bus to the master computer. The master computer is also connected to the network, to which several further computers are also connected. One of these further computers is also connected, besides to the net, to the switchgear cabinet monitoring arrangement. The switchgear cabinet monitoring arrangement per se is designed relatively elaborately and also has a connecting unit for connection to a network, for example.

SUMMARY OF THE INVENTION

One object of this invention is to provide a switchgear cabinet monitoring arrangement of the type mentioned but wherein a group of switchgear cabinets can be monitored with less cost outlays.

This object is achieved with a switchgear cabinet monitoring arrangement as set forth in this specification and in the claims. A further monitoring device arranged or to be arranged in a respective further switchgear cabinet is assigned to the base monitoring device, each which is connected to the base monitoring device with a field bus. At least one further monitoring device also has several sensor connections and at least one triggering connection and is designed for monitoring, controlling and/or regulating switchgear cabinet functions.

It is necessary to equip only the base monitoring device more elaborately in order to offer, for example, expanded control, regulation and evaluation options, as well as a connection to a net. The further monitoring devices of the local group can communicate with the more elaborate base monitoring device via the simply equipped field bus of the bus system and can utilize its control options, for example in order to perform definite controls of built-in units or add-on units, so that less elaborate control devices are sufficient for the monitoring devices. If a net connection is provided, only the base monitoring device needs to be appropriately equipped.

The measures, that a data exchange via the field bus is only provided between the at least one further monitoring device and the base monitoring device, also contribute to the simplified embodiment of the switchgear cabinet monitoring arrangement.

A simple and also individual switchgear cabinet monitoring, control and/or adjustment, or respectively programming, from a remote location, for example a master computer, is possible because only the base monitoring device has a network connection unit for making a connection with the network.

An exact evaluation and versatile control options result, along with a relatively simple design of the switchgear cabinet monitoring arrangement. Data received from the further monitoring devices can be processed and evaluated and/or transmitted via the network connecting unit to the network in a control device of the base monitoring device. With the layout of the control device in the base monitoring device it is possible for the individual further monitoring device to individually exchange monitoring and control data with the control device of the base monitoring device via the field bus, without interfering with each other.

If pre-processing or complete processing of the sensor signals can be performed in the further monitoring devices, the further monitoring devices can take on essential monitoring and control functions, as well as registration and display functions.

The supply with electrical power of the switchgear cabinet monitoring arrangement becomes possible in a simple manner, for example with a single net unit in the base monitoring device and only a single net connection. The further monitoring devices are connected to the voltage supply via the base monitoring device. Voltage monitoring and emergency power supply for the further monitoring devices is also possible solely from the base monitoring device.

With the steps, wherein several switchgear cabinet monitoring arrangements are connected via the network connection, and/or at least one switchgear cabinet monitoring arrangement is connected with a master computer, it is possible to monitor and control local groupings of switchgear cabinet monitoring arrangements, via the network in a large linkage.

Varied monitoring and control functions are made possible with a comparatively low cost outlay because the design of the switchgear cabinet monitoring device, wherein the further monitoring devices form satellites, for example, of the base monitoring device.

BRIEF DESCRIPTION OF THE DRAWINGS

This invention is explained in greater detail by exemplary embodiments making reference to the drawings, wherein the single drawing FIGURE represents a block diagram of a switchgear cabinet monitoring arrangement.

DESCRIPTION OF PREFERRED EMBODIMENTS

The drawing FIGURE represents a switchgear cabinet monitoring arrangement 1 with a base monitoring device 2, to which three further monitoring devices 3 are connected via a simple field bus, for example an I2C bus. By means of a suitable field bus FB it is also possible to connect more further monitoring devices 3, for example up to eight further monitoring devices 3, with the base monitoring device 2 in a simple manner via the bus connection 2.2. The base monitoring device 2 has a network connection unit 2.1, for example an ethernet network connection unit, for establishing a network connection NW. The base monitoring device furthermore has a control device 2.3, as well as several sensor connections S, for example for a temperature sensor, a smoke detector, a vibration sensor, a door position sensor, a humidity sensor and the like. Furthermore, one or several triggering connections AST are provided, by means of which a magnetic lock of the switchgear cabinet door, fans or other climate control devices, a fire extinguishing device, or the like are received when appropriate sensor signals or triggering signals arrive via the network NW from the control device 2.3.

The further monitoring devices 3, which are connected by means of appropriate bus connections 3.1 to the field bus FB, also have corresponding or similar sensor connections S and triggering connections AST as the base monitoring device 2. They also contain control units for performing a pre-evaluation of the sensor signals and simple triggering via the triggering connections AST, or at least pass on the sensor signals to the sensor device 2.3 of the base monitoring device 2. Also, the monitoring signals and triggering of display elements are stored at the further monitoring devices. However, the control unit of the further monitoring devices 3 is considerably less elaborate than the control device of the base monitoring device 2, which provides a data exchange with the further monitoring devices 3 via the field bus FB, and by means of which refined individual evaluations of the data received from the built-in or added-on units connected to their triggering connections AST are possible. The further monitoring devices 3 are preferably laid out so that they do not exchange data with each other in order to keep the outlay appropriately small in comparison with the base monitoring device 2, but on the other hand they assure a practically complete monitoring and control function of the further monitoring devices 3.

The base monitoring device 2, as well as the further monitoring devices 3, can be individually triggered via the network connection NW from a remote location, for example a master computer, and can transmit data to the latter. Programming is also possible from the remote location via the network connection NW, wherein the individual further monitoring devices 3 can be individually addressed. The described design, however, in particular offers the possibility of performing programming steps in regard to the further monitoring devices 3 from the remote location, or also from the base monitoring device 2, since the control device 2.3 provides individual monitoring and control stages for the further monitoring devices 3. The configuration of the entire switchgear cabinet monitoring arrangement 1, comprising the base monitoring device 2 and the further monitoring devices 3, can be performed in the control device 2.3 of the base monitoring device 2.

A versatile monitoring and control function of the respective monitoring devices, or respectively of the associated switchgear cabinets, is offered by means of the described steps, along with a simple design of the switchgear cabinet monitoring arrangement.

What is claimed is:

1. In a switchgear cabinet monitoring arrangement having a base monitoring device (2) arranged in a switchgear cabinet and having at least one bus connection (2.2), a plurality of sensor connections (S) and at least one triggering connection (AST), for at least one of monitoring, controlling and regulating switchgear cabinet functions, the improvement comprising:

at least one further monitoring device (3) arranged in a respective further switchgear cabinet being assigned to the base monitoring device (2), the at least one further monitoring device (3) connected to the base monitoring device (2) by a field bus (FB), wherein a data exchange via the field bus (FB) is provided between the at least one flier monitoring device (3) and the base monitoring device (2);

the at least one further monitoring device (3) having the sensor connections (S) and the at least one triggering connection (AST) and designed for at least one of monitoring, controlling and regulating functions of the respective further switchgear cabinet;

the sensor connections (S) of the base monitoring device (2) and the at least one further monitoring device (3) selected from a group consisting of temperature sensors, smoke detectors, vibration sensors, door position sensors, humidity sensors, and combinations thereof; and only the base monitoring device (2) having a network connection unit (2.1) for making a network connection (NW) and data received from the at least one further monitoring device (3) being processed and at least one of evaluated and transmitted via the network connection unit (2.1) to the network in a control device (2.3) of the base monitoring device (2).

2. In the switchgear cabinet monitoring arrangement in accordance with claim 1, wherein one of pre-processing and complete processing of sensor signals can be performed in the at least one further monitoring device (3).

3. In the switchgear cabinet monitoring arrangement in accordance with claim 1, wherein the at least one further monitoring device (3) is connected to a voltage supply via the base monitoring device (2).

4. In the switchgear cabinet monitoring arrangement in accordance with claim 1, wherein several switchgear cabinet monitoring arrangements (1) are connected via the network connection (NW) and at least one switchgear cabinet monitoring arrangement (1) is connected with a master computer.

5. In the switchgear cabinet monitoring arrangement in accordance with claim 2, wherein the at least one further monitoring device (3) is connected to a voltage supply via the base monitoring device (2).

6. In the switchgear cabinet monitoring arrangement in accordance with claim 5, wherein several switchgear cabinet monitoring arrangements (1) are connected via the network connection (NW) and at least one switchgear cabinet monitoring arrangement (1) is connected with a master computer.

* * * * *